A. WOLKENSTEIN.
CONDIMENT HOLDER.
APPLICATION FILED MAY 27, 1909.
934,493.
Patented Sept. 21, 1909.
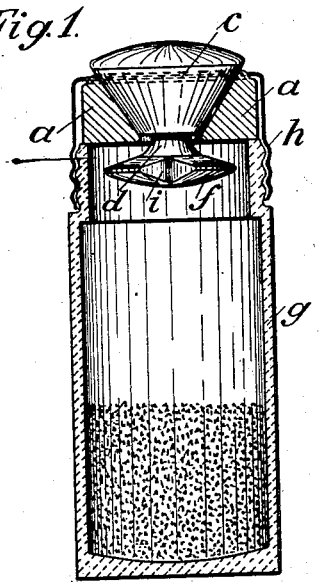
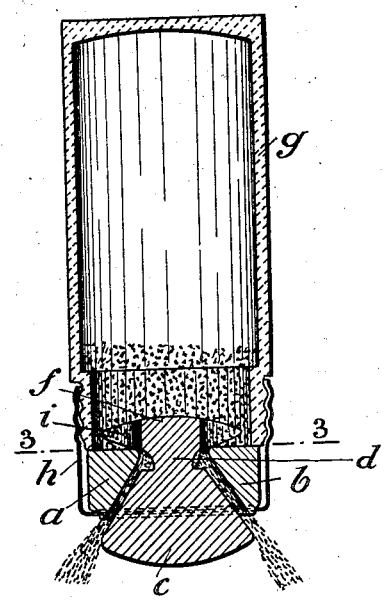
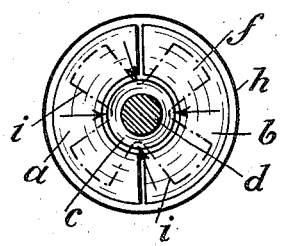
Witnesses:
C. H. Crawford
E. Schallinger
Inventor:-
Arnold Wolkenstein
by B. Singer
Attorney

UNITED STATES PATENT OFFICE.

ARNOLD WOLKENSTEIN, OF VIENNA, AUSTRIA-HUNGARY.

CONDIMENT-HOLDER.

934,493.

Specification of Letters Patent.   Patented Sept. 21, 1909.

Application filed May 27, 1909.   Serial No. 499,066.

*To all whom it may concern:*

Be it known that I, ARNOLD WOLKENSTEIN, a citizen of the Empire of Austria-Hungary, residing at Vienna, Austria-Hungary, have invented certain new and useful Improvements in Condiment-Holders; and I do hereby declare the following to be a full, clear, and exact description of the invention, such as will enable others skilled in the art to which it appertains to make and use the same.

My invention relates to improvements in condiment holders of that class, in which means are provided for powdering or sprinkling the condiment, for example sugar casters, pepper casters, salt shakers, etc. And the object of the improvements is to provide a condiment holder which, when out of use, preserves the condiment from dirt, and when used uniformly and finely powders or sprinkles the same. For this purpose, my improved condiment holder is provided with a stopper which perfectly closes the can or bottle when the same is out of use, and which provides suitable apertures when it is taken to use.

For the purpose of explaining the invention an example embodying the same has been shown in the accompanying drawing, in which the same letters of reference have been used in all the views to indicate corresponding parts.

In said drawing—Figure 1, is a vertical cross-section of a salt shaker showing the same in its out of use position, Fig. 2, is a similar cross-section of the salt shaker showing the same in its position of use, and Fig. 3, is a horizontal cross-section taken on the line 3—3 of Fig. 2.

In the example illustrated in the drawing the salt shaker consists of a reservoir $g$ provided at its mouth with a ring $a$ having a conical aperture. Within the said aperture there fits a conical closing body $c$ which, in the position shown in Fig. 1, provides a tight closure for the reservoir. In the upturned position of the salt shaker shown in Fig. 2, the stopper $c$ will slightly drop downward by gravity, means being provided to prevent the same from dropping beyond a desired distance, so that a circular passage is formed between the stopper and the ring through which the salt is uniformly dispensed. As shown, the said means consists of a flange $f$ provided on the conical body $c$ and located within the reservoir and below the ring $a$. At its margin, the said flange is provided with notches $i$ permitting the egress of the salt from the reservoir to the annular passage provided between the stopper $c$ and the ring $a$, as clearly shown in Fig. 2. The ring $a$ may be secured to the reservoir in any suitable way. In the example shown, a cap screw $h$ is used for this purpose, so that the ring can readily be removed from or replaced to the can $g$, if it is desired to refill the same.

In the position of the can shown in Fig. 1, the stopper is seated on the ring $a$ in the manner of a valve, and it thereby tightly closes the reservoir $g$ so that impurities have no access to the condiment. If the salt shaker in reversed, as shown in Fig. 2, the stopper is slightly raised from its seat, so that the salt can flow downward through the notches $i$ and the passage provided between the ring $b$ and the stopper $c$, and is uniformly distributed.

I claim:

A condiment holder comprising in combination, a receptacle provided with an outwardly flaring opening, and a solid closing body having a conical portion seated in said opening, said body having a shank reduced in size with respect to the smallest diameter of the conical portion and also reduced in size with respect to the smallest portion of said opening, said shank also having a solid flange provided with notches extending inwardly to points within the smallest diameter of said openings, substantially as described.

In testimony whereof I hereunto affix my signature in the presence of two witnesses.

ARNOLD WOLKENSTEIN.

Witnesses:
 ROBERT W. HEINGARTNER,
 AUGUST FUGGER.